No. 842,807. PATENTED JAN. 29, 1907.
P. McNERNEY.
APPARATUS FOR UNLOADING PLATFORM CARS.
APPLICATION FILED SEPT. 29, 1906.
5 SHEETS—SHEET 1.
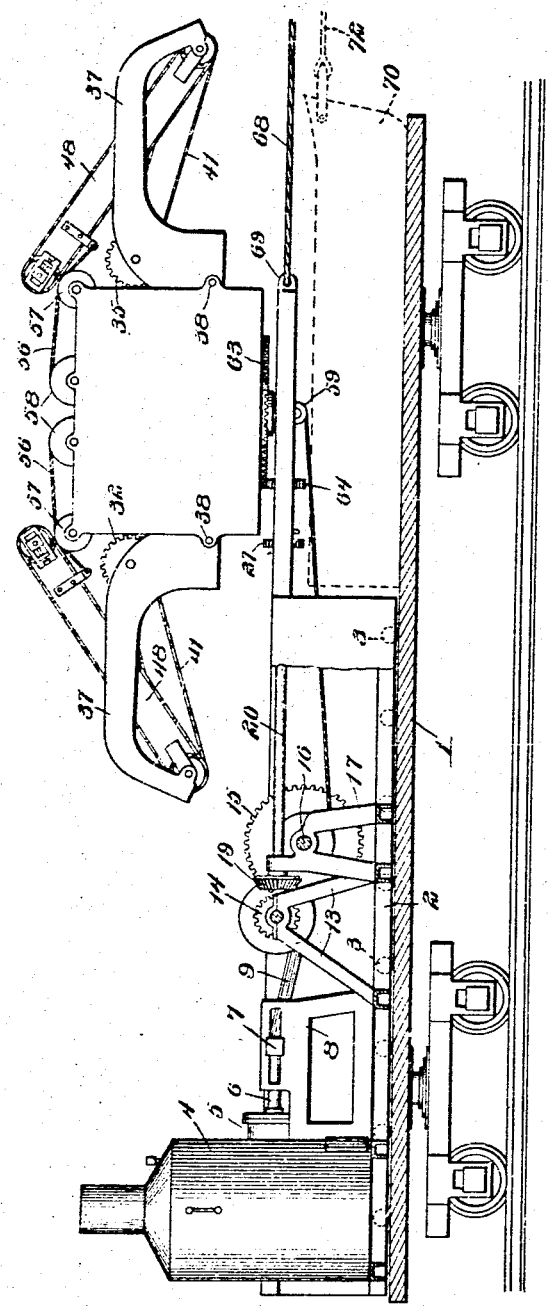
Witnesses
Louis R. Heinrichs
Inventor
Peter McNerney
By Victor J. Evans
Attorney

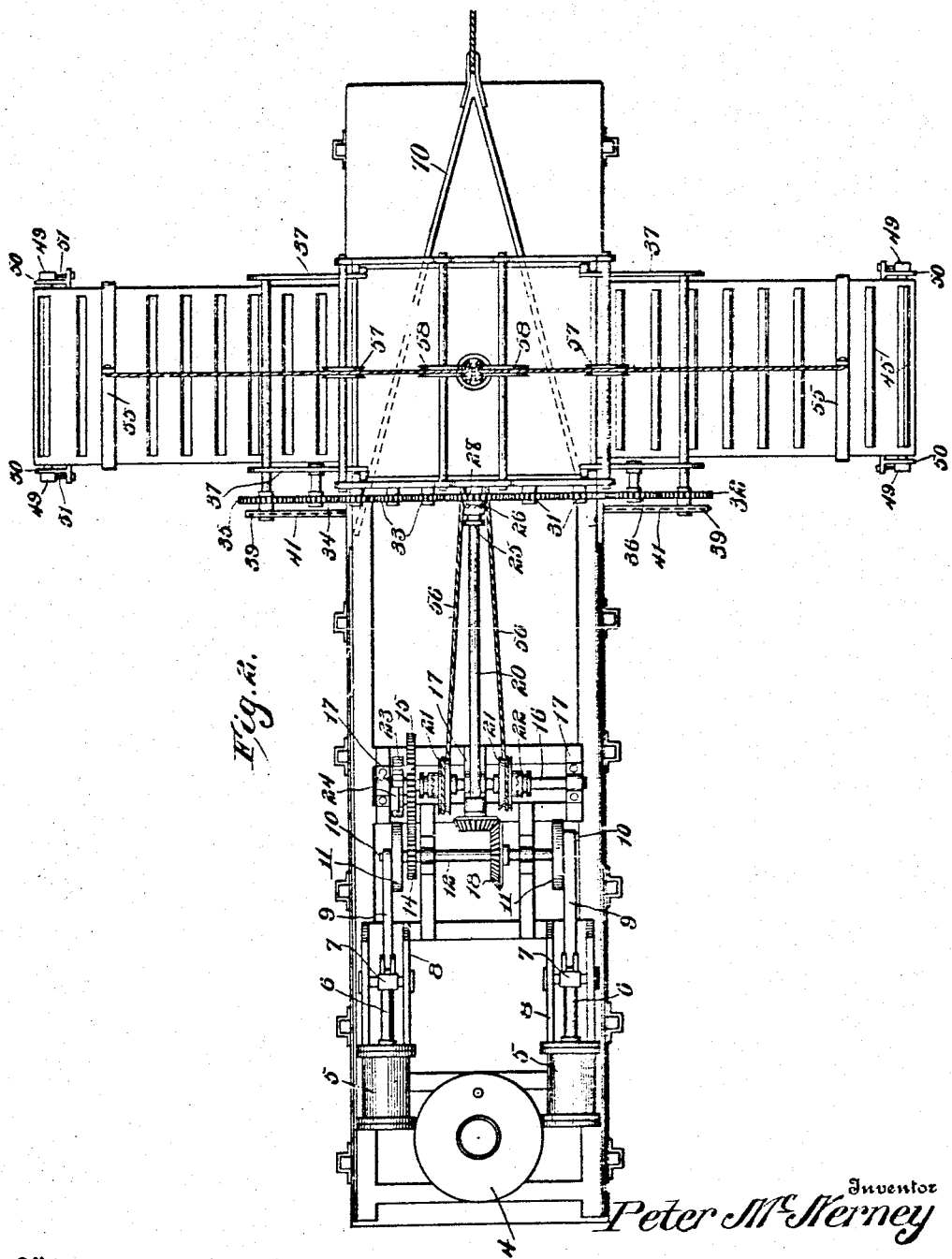

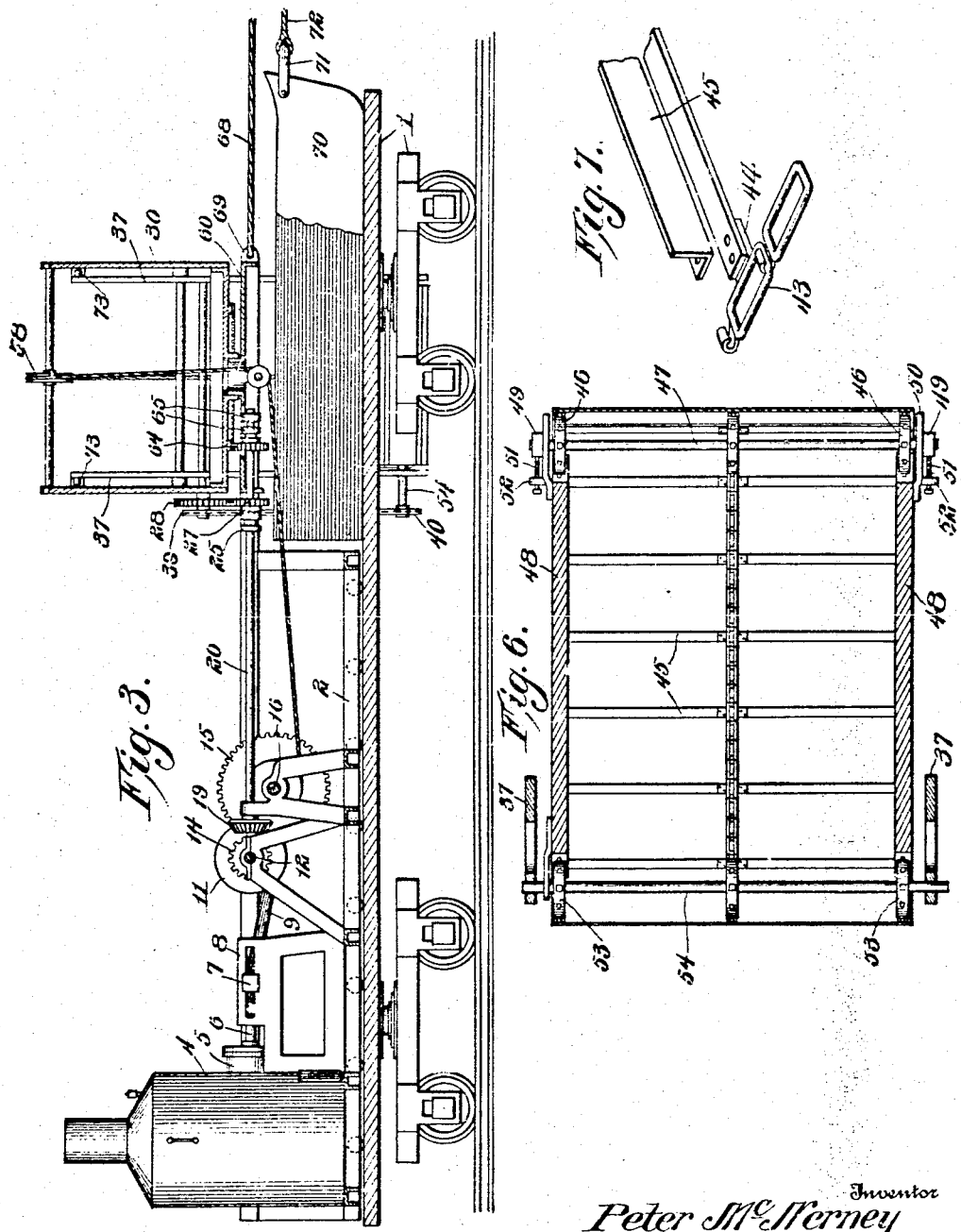

No. 842,807. PATENTED JAN. 29, 1907.
P. McNERNEY.
APPARATUS FOR UNLOADING PLATFORM CARS.
APPLICATION FILED SEPT. 29, 1906.
5 SHEETS—SHEET 4.
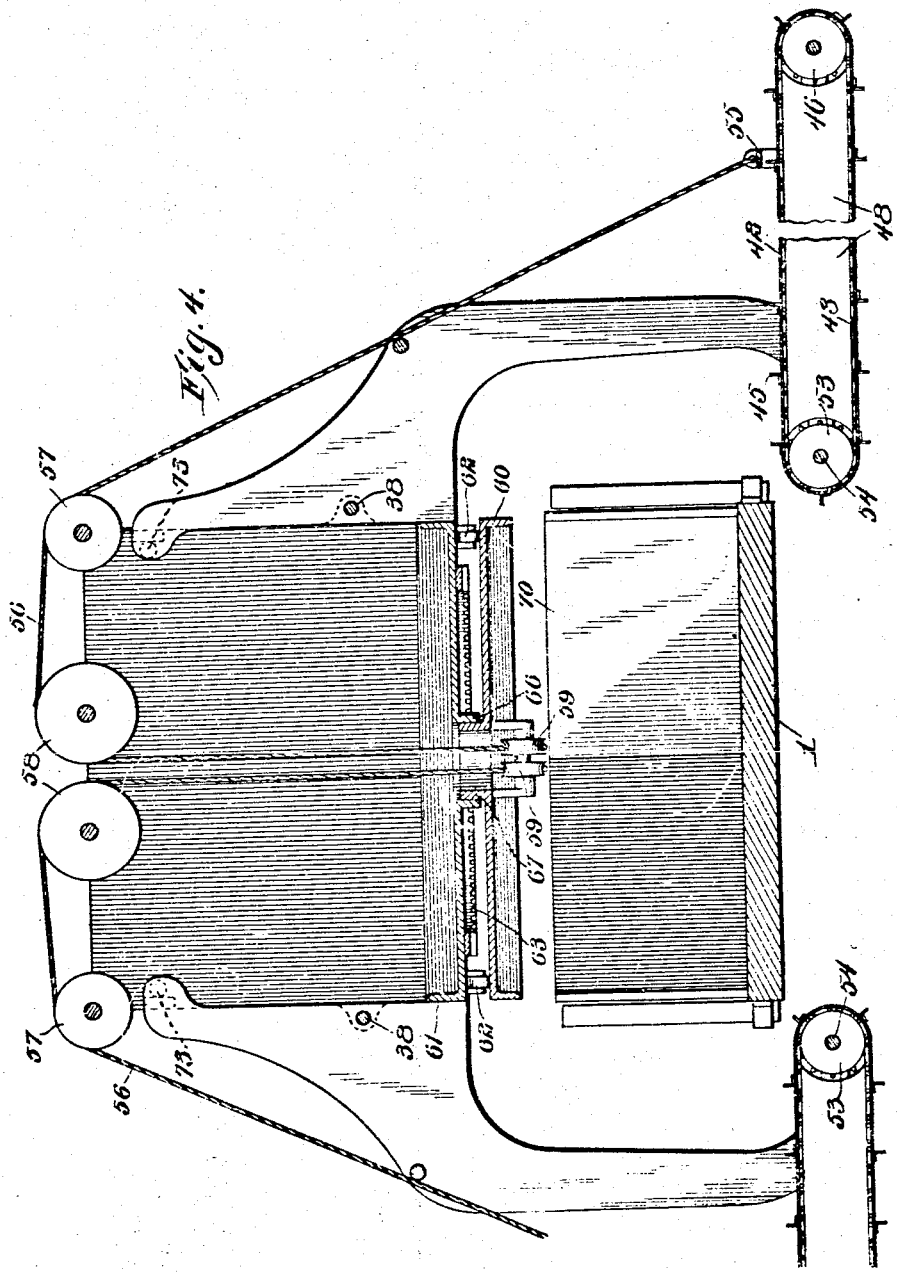

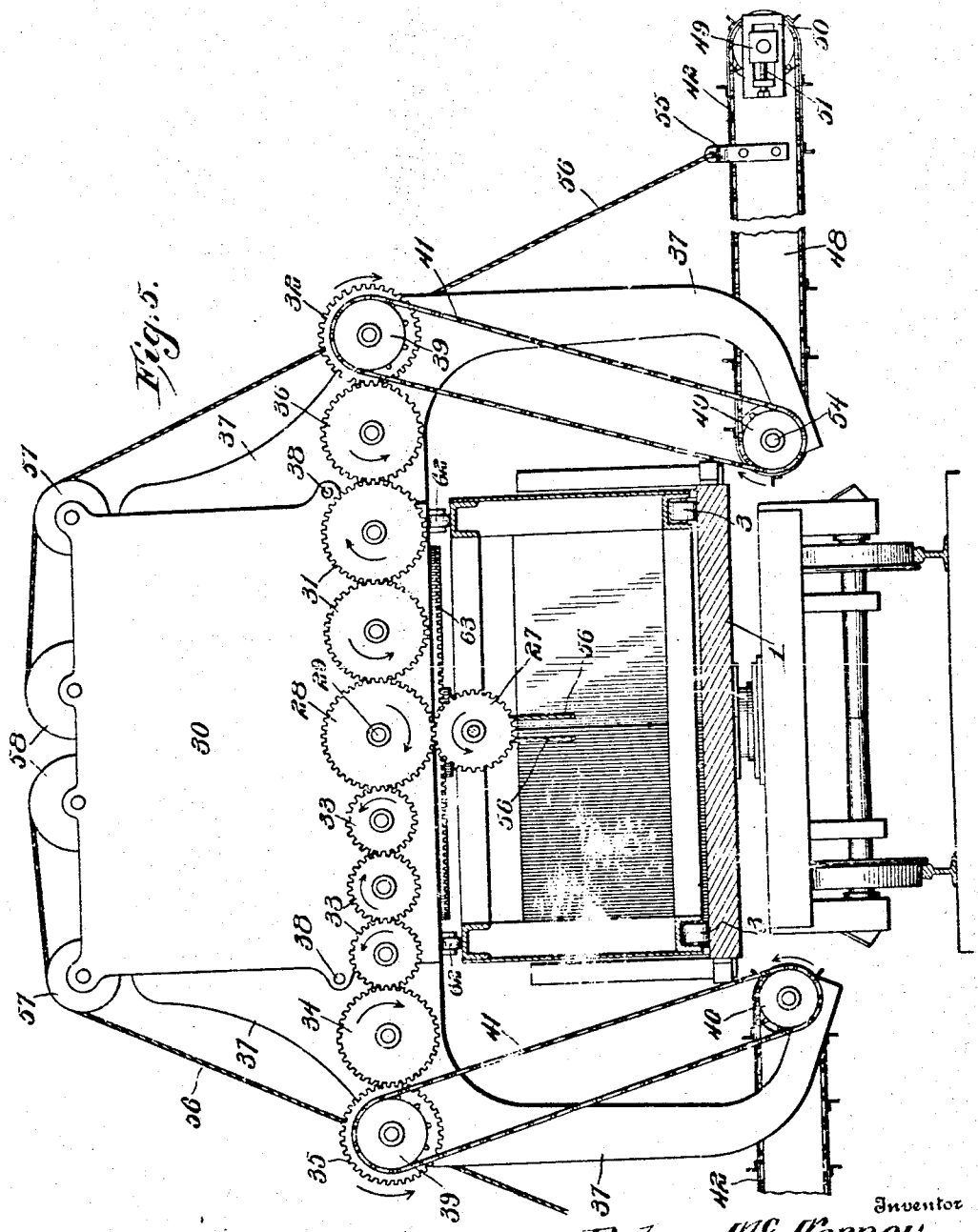

UNITED STATES PATENT OFFICE.

PETER McNERNEY, OF LAKE ELMO, MINNESOTA.

APPARATUS FOR UNLOADING PLATFORM-CARS.

No. 842,807.　　　Specification of Letters Patent.　　　Patented Jan. 29, 1907.

Application filed September 29, 1906. Serial No. 336,704.

*To all whom it may concern:*

Be it known that I, PETER McNERNEY, a citizen of the United States, residing at Lake Elmo, in the county of Washington and State of Minnesota, have invented new and useful Improvements in Apparatus for Unloading Platform-Cars, of which the following is a specification.

This invention relates to apparatus for unloading platform-cars; and one of the principal objects of the same is to provide efficient means for delivering gravel or dirt from platform-cars at the required distance at opposite sides of the track.

Another object of my invention is to provide reliable and efficient means whereby the contents of platform-cars may be deposited at the opposite sides of the railroad-track at the required distance from said cars and to provide means whereby the unloading apparatus may be drawn from one platform-car to the other the full length of the train.

Still another object of the invention is to provide an apparatus mounted upon rollers to be drawn over platform-cars to discharge the contents of said cars upon laterally-extending conveyers to deposit the load upon one or both sides of the track at some distance from the cars.

Another object of my invention is to provide a portable unloading device to be moved from car to car for unloading the contents thereof at some distance upon opposite sides of the track and to provide means for lifting the conveyers up out of operative position and swinging them into alinement with the cars when the machine is to be conveyed from place to place.

The foregoing and other objects may be attained by means of the construction illustrated in the accompanying drawings, in which—

Figure 1 is a side elevation and partial section of an unloading apparatus constructed in accordance with my invention. Fig. 2 is a plan view of the same. Fig. 3 is a longitudinal section of the same. Fig. 4 is a transverse section, on an enlarged scale, showing the turn-table and the conveyers for depositing the gravel or other material upon opposite sides of the track. Fig. 5 is a vertical transverse sectional view of the apparatus. Fig. 6 is a plan view of one of the conveyers and showing the means for supporting the conveyers in section. Fig. 7 is a detail perspective view of one of the carriers of one of the endless conveyers.

Referring to the accompanying drawings for a more particular description of my invention, the numeral 1 designates a platform-car of the usual or any preferred construction, and mounted upon said platform-car is my unloading apparatus consisting of a frame 2, mounted upon rollers 3, and comprising a platform upon which is mounted an engine consisting of a boiler 4 and oppositely-disposed cylinders 5. The piston-rod 6 carries slides 7, supported in guides 8, and connected to the ends of the piston-rod 6 are connecting-rods 9, the ends of which are pivoted to wrist-pins 10, carried by disks 11, fixed to a transverse shaft 12, journaled in brackets 13 on bars forming part of the frame 2. Fixed to the shaft 12 is a crown gear-wheel 14, which meshes with a similar gear-wheel 15 of larger diameter, fixed to a shaft 16, journaled in a pair of oppositely-disposed brackets 17, rising from the platform. Also secured to the shaft 12 is a bevel-gear 18, which meshes with a pinion 19, secured to a longitudinal shaft 20. The shaft 16 carries oppositely-disposed grooved pulleys 21, and at the outer sides of said pulleys sliding clutches 22 are provided for throwing the grooved pulleys 21 into and out of operation. A ratchet-wheel 23, carried by the shaft 16, is engaged by a pawl 24 on the frame 2 for holding the shaft 16 and the pulleys 21 against retrograde movement until released by said pawl. A sliding clutch 25 is mounted on the shaft 20 and is adapted to engage a clutch member 26, formed on the hub of a crown gear-wheel 27, journaled on the shaft 20, said gear-wheel 27 meshing with a similar gear 28, journaled on a stub-shaft 29, secured and projecting from a turn-table 30 to be hereinafter referred to. The gear-wheel 28, as shown in Fig. 5, is in mesh with a series of gear-wheels 31, designed to operate the gear-wheel 32, which actuates one of the conveyers, while upon the opposite side of said gear-wheel 28 a series of gear-wheels 33 of smaller diameter mesh with a gear-wheel 34 to actuate the gear-wheel 35 for operating the laterally-extending conveyer on the opposite side of the unloader. The gear-wheels 32, 34, 35, and 36 are journaled upon stub-shafts carried by arms 37, pivoted at 38 upon shafts extending through the turn-table 30 at opposite sides thereof. Sprocket-wheels 39 and 40, journaled in the arms 37, carry sprocket-chains 41 for actuating the conveyer-belts 42. These conveyer-belts each consist of sprocket-chains 43, the links of which are provided with brackets 44, to which are secured angular carriers 45, which serve to carry the material outward and deposit it at the opposite sides of the car.

The chains 43 are actuated by means of sprocket-wheels 46, mounted upon shafts 47, journaled in side boards 48, disposed at opposite sides of the conveyers 42, as shown in Fig. 2. For tightening the conveyers 42 the shaft 47 is mounted in sliding boxes 49, mounted in guides 50, and said boxes being adjustable in the guides by means of bolts 51 passing through brackets 52. The inner ends of the conveyers 42 are provided with sprocket-wheels 53, mounted upon a shaft 54, journaled in the arms 37, and the chain 43 engages the sprocket-wheels 53. Brackets 55 are secured to the conveyers 42, and cables 56 are connected to the brackets 55 and extended around grooved pulleys 57 and 58, journaled in the upper portion of the turn-table 30, said cables extending downward through the turn-table and passing around pulleys 59, journaled in brackets upon the stationary member 60 of said turn-table, as shown in Fig. 4, said cables 56 extending rearward and being secured to the groove-pulleys 21 on the shaft 16.

The turn-table 30 comprises a hollow metal structure provided with a bottom 61, carrying caster-wheels 62, supported on the stationary member 60 of the turn-table. The bottom portion 61 of the turn-table is provided with a circular rack 63, designed to mesh with a pinion 64 on the shaft 20, and a clutch 65 on said shaft is adapted to throw the gear-wheel 64 into and out of operative connection with the circular rack 63. The levers for actuating the clutches 25 and 65 are omitted from the drawing, but may be of the usual construction. In the bottom of the turn-table 30 a hollow projecting boss 66 engages a similar boss 67 on the stationary member 60 of the turn-table, as shown in Fig. 4. A draft-cable 68 is connected to a clevis 69 at the front of the stationary member 60 of the turn-table, as shown in Fig. 3.

A plow 70, comprising oppositely-diverging plates adapted to slide upon the platform-cars and to push the contents thereof onto the conveyers 42, is provided with a clevis 71, to which a cable 72 is secured.

The operation of my unloading apparatus may be described as follows: My unloader may be carried upon the rear platform-car 1 of the train and when the dirt or gravel has been taken to the place of discharge the locomotive of the train may be uncoupled from said train and the cables 68 and 72 may be connected to said locomotive. As the locomotive moves forward it carries the plow 70 and the unloading mechanism from one car to the other, and as the plow moves forward it pushes the contents of the platform-car onto the conveyers 42, and said conveyers deposit the material at the opposite sides of the track, as will be understood, the unloading mechanism being operated by means of the engine 45. Should it be desired to deposit the dirt or gravel upon one side of the track at some distance therefrom and upon the other side close to the track, one of the clutches 22 may be thrown into operation to operate one of the cables 56 to elevate one of the conveyers 42. When it is desired to throw both of the conveyers 42 out of operation, as when moving from place to place, both of the clutches 22 are thrown into operative connection with the grooved pulleys 21, and the conveyers 42 are drawn upward, and a further revolution of the shaft 16 will move the arms 37 upon their pivotal points 38 to throw the upper portions of said arms 37 downward within the turn-table to the position shown in Fig. 1. The clutch members 65 are engaged when it is desired to throw the gear-wheel 64 into mesh with the circular rack 63 for turning the conveyers into alinement with the cars, as shown in Fig. 1. When in this condition, the plow 70 and the unloading mechanism may be carried forward from car to car to unload the contents upon opposite sides of the track contiguous thereto, or when the mechanism is in this condition it may be thrown out of operation and the unloaded cars coupled up to the locomotive and the cables 58 and 72 uncoupled to return for another load. Stops 73, carried by the arms 37 at their upper ends, serve to limit the downward movement of said arms.

From the foregoing it will be obvious that my unloading apparatus may be used to advantage in discharging gravel, sand, or dirt either at a distance from the sides of a train or contiguous to the track.

My apparatus operates efficiently and will unload a train quickly and can be readily carried from place to place whenever required.

Having thus described the invention, what I claim is—

1. In an apparatus of the character described, oppositely-disposed conveyers in combination with a movable plow for discharging the contents of platform-cars onto said conveyers.

2. In an unloading apparatus, oppositely-disposed conveyers, a plow comprising diverging sides, said unloading apparatus being mounted upon rollers and adapted to be drawn from one car to the other, substantially as described.

3. In a device of the character described, oppositely-disposed conveyers pivoted to arms, said arms being pivoted to swing upwardly, and means for swinging said conveyers and said arms.

4. In an unloading apparatus, oppositely-disposed conveyers pivoted to arms, said arms being pivoted to swing upwardly and downwardly, a turn-table to which said arms are pivoted, means for moving said conveyers and arms, and means for turning said turn-table.

5. In an unloading apparatus, a turn-table, means for actuating said turn-table, arms pivoted to said turn-table, conveyers pivoted to said arms, and means for actuating said conveyers and for swinging said arms on their pivotal points.

6. In an unloading apparatus, a frame, an engine mounted thereon, rollers journaled in the frame, a turn-table on said frame, arms pivoted to the turn-table, conveyers pivoted to the arms, a plow having divergent sides, and means for actuating the conveyers and moving the arms, substantially as described.

7. In an unloading apparatus adapted to be drawn from car to car, the combination of a plow having divergent sides, a turn-table disposed above the plow, arms pivoted to the turn-table, conveyers pivoted to the arms, cables attached to the conveyers, and means for elevating the conveyers and arms, and means for turning the turn-table, substantially as described.

8. In an unloading apparatus, a frame mounted on rollers, a turn-table mounted on said frame, arms pivoted to the turn-table, conveyers pivoted to the arms, an engine mounted on the frame, a winding mechanism operated by said engine, cables connected to the conveyers and to the winding mechanism for raising and lowering said conveyers and arms, and means for rotating said turn-table.

9. In an unloading apparatus, a plow having diverging sides, a frame mounted on rollers, an engine on the frame, a turn-table mounted on the frame, arms pivoted to the turn-table, conveyers connected to said arms, winding mechanism operated by said engine, cables connected to said conveyers and passing over grooved pulleys to the winding mechanism for raising and lowering said conveyers and arms, and means for operating said turn-table.

10. In an unloading device, a frame mounted on rollers and adapted to be drawn over the cars for unloading the same, a plow having diverging sides, a turn-table mounted upon rollers, means for operating said turn-table, and a train of gearing for operating said conveyers, substantially as described.

In testimony whereof I affix my signature in presence of two witnesses.

PETER McNERNEY.

Witnesses:
RICHARD VALLIANT,
RAYMOND McNERNEY.